United States Patent
Cho et al.

(10) Patent No.: US 9,616,647 B2
(45) Date of Patent: Apr. 11, 2017

(54) DEVICE FOR BONDING WINDOW AND METHOD FOR MANUFACTURING DISPLAY DEVICE USING THE SAME

(71) Applicants: Yong-Youl Cho, Yongin (KR); Jong-Hwan Kim, Yongin (KR); Kyung-Su Lee, Yongin (KR)

(72) Inventors: Yong-Youl Cho, Yongin (KR); Jong-Hwan Kim, Yongin (KR); Kyung-Su Lee, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 466 days.

(21) Appl. No.: 13/920,200

(22) Filed: Jun. 18, 2013

(65) Prior Publication Data

US 2014/0096892 A1 Apr. 10, 2014

(30) Foreign Application Priority Data

Oct. 5, 2012 (KR) .......................... 10-2012-0110715

(51) Int. Cl.
*B32B 37/12* (2006.01)

(52) U.S. Cl.
CPC .......... *B32B 37/12* (2013.01); *B32B 2309/68* (2013.01); *B32B 2310/0831* (2013.01); *B32B 2457/20* (2013.01)

(58) Field of Classification Search
CPC ........ B32B 2309/68; B32B 2310/0831; B32B 2457/20; B32B 37/12; B32B 37/10; B29C 65/1406; B29C 65/14

USPC ............................. 156/272.2, 285, 286, 381
See application file for complete search history.

(56) References Cited

U.S. PATENT DOCUMENTS

| | | | | |
|---|---|---|---|---|
| 4,923,552 | A | * 5/1990 | Fukushima et al. | .. G02F 1/1333 156/273.7 |
| 2003/0226633 | A1 | * 12/2003 | Muramoto | ............. B32B 37/10 156/145 |
| 2005/0077553 | A1 | 4/2005 | Kim et al. | |
| 2006/0027318 | A1 | * 2/2006 | Hashizume | ......... B32B 38/1841 156/285 |
| 2010/0253902 | A1 | * 10/2010 | Yamazaki | ............. G02F 1/1303 349/158 |

(Continued)

FOREIGN PATENT DOCUMENTS

| KR | 10-2005-0035712 A | 4/2005 |
|---|---|---|
| KR | 10-2008-0062424 | 7/2008 |

(Continued)

*Primary Examiner* — Christopher Schatz
(74) *Attorney, Agent, or Firm* — Lee & Morse, P.C.

(57) ABSTRACT

A device for bonding a window includes a chamber having an internal space, a display panel fixing unit in the chamber and including a first curved surface, the first curved surface being configured to attach to a flexible display panel, a window fixing unit in the chamber and including a second curved surface, at least part of the window fixing unit including an ultraviolet transmitting material, the second curved surface facing the first curved surface and being complementary with the first curved surface, and the second curved surface being configured to attach to a window, and an ultraviolet irradiating unit on the window fixing unit, the ultraviolet irradiating unit being configured to irradiate ultraviolet light through the window fixing unit toward the first curved surface of the display panel fixing unit.

10 Claims, 6 Drawing Sheets

(56) References Cited

U.S. PATENT DOCUMENTS

2011/0177261 A1* 7/2011 Ishii ................ G02F 1/133308
                                                              428/1.5

FOREIGN PATENT DOCUMENTS

| KR | 10-2010-0131567 A | 12/2010 |
| KR | 10-2011-0115630 A | 10/2011 |

* cited by examiner

DEVICE FOR BONDING WINDOW AND METHOD FOR MANUFACTURING DISPLAY DEVICE USING THE SAME

CROSS-REFERENCE TO RELATED APPLICATION

This application claims priority to and the benefit of Korean Patent Application No. 10-2012-0110715 filed in the Korean Intellectual Property Office on Oct. 5, 2012, the entire contents of which are incorporated herein by reference.

BACKGROUND

1. Field

Example embodiments relate to a device for bonding a window and a method for manufacturing a display device using the same, and more particularly, to a device and a method for attaching a window member to a display panel.

2. Description of the Related Art

Various kinds of display devices, e.g., an organic light emitting display device and a liquid crystal display device, have been used in monitors of a computer, a portable terminal, and various kinds of information apparatuses. In the display devices, a window for protecting a display panel is attached to the display panel displaying images, e.g., in a direction in which the images are output.

The above information disclosed in this Background section is only for enhancement of understanding of the background of the invention and therefore it may contain information that does not form the prior art that is already known in this country to a person of ordinary skill in the art.

SUMMARY

Example embodiments have been made in an effort to provide a device and a method having a uniformly cured adhesive layer between a window and a display panel.

Further, the example embodiments have been made in an effort to provide a device and a method having substantially no bubbles in an adhesive layer between a window and a display panel.

An exemplary embodiment provides a device for bonding a window, including a chamber having an internal space, a display panel fixing unit in the chamber and including a first curved surface, the first curved surface being configured to attach to a flexible display panel, a window fixing unit in the chamber and including a second curved surface, at least part of the window fixing unit including an ultraviolet transmitting material, the second curved surface facing the first curved surface and being complementary with the first curved surface, and the second curved surface being configured to attach to a window, and an ultraviolet irradiating unit on the window fixing unit, the ultraviolet irradiating unit being configured to irradiate ultraviolet light through the window fixing unit toward the first curved surface of the display panel fixing unit.

The window fixing unit may further include a moving unit configured to move the window fixing unit toward the display panel fixing unit.

Each of the first curved surface and the second curved surface may include a flat surface in a center portion and curved edges extending from the flat surface.

The window fixing unit may include side parts formed of an ultraviolet transmitting material and a center part formed of an ultraviolet non-transmitting material, the center part defining the flat surface of the second curved surface, and the side parts defining the curved edges of the second curved surface.

Another exemplary embodiment provides a device for bonding a window, including a chamber having an internal space, a display panel fixing unit in the chamber and including a first curved surface, the first curved surface having a flat center portion and curved edges extending from the flat center portion, and the first curved surface being configured to attach to a flexible display panel, a window fixing unit in the chamber and including a second curved surface, the second curved surface facing the first curved surface and being complementary with the first curved surface, the second curved surface being configured to attach to a window, and an ultraviolet irradiating unit in the chamber, the ultraviolet irradiating unit being configured to irradiate ultraviolet light toward edges of the first curved surface.

The window fixing unit may further include a moving unit configured to move the window fixing unit toward the display panel fixing unit.

Another exemplary embodiment provides a method for manufacturing a display device, the method including disposing a display panel on a first curved surface of a display panel fixing unit, coating an adhesive layer on the display panel, disposing a window on a second curved surface of a window fixing unit, such that the first curved surface and the second curved surface face each other, moving the window fixing unit toward the display panel fixing unit, such that the window contacts the display panel via the adhesive layer, and curing the adhesive layer by irradiating ultraviolet light to the adhesive layer.

The window fixing unit may be formed of an ultraviolet transmitting material, and during curing of the adhesive layer, the ultraviolet light is irradiated through the window fixing unit.

The first curved surface and the second curved surface may have respective edges that are curved surfaces and respective centers that are flat surfaces.

Curing the adhesive layer may include irradiating the ultraviolet light to the respective edges.

Curing the adhesive layer may include irradiating the ultraviolet light through the window fixing unit.

Moving the window fixing unit toward the display panel fixing unit and curing the adhesive layer may be performed in vacuum atmosphere.

DETAILED DESCRIPTION

Figure 1:
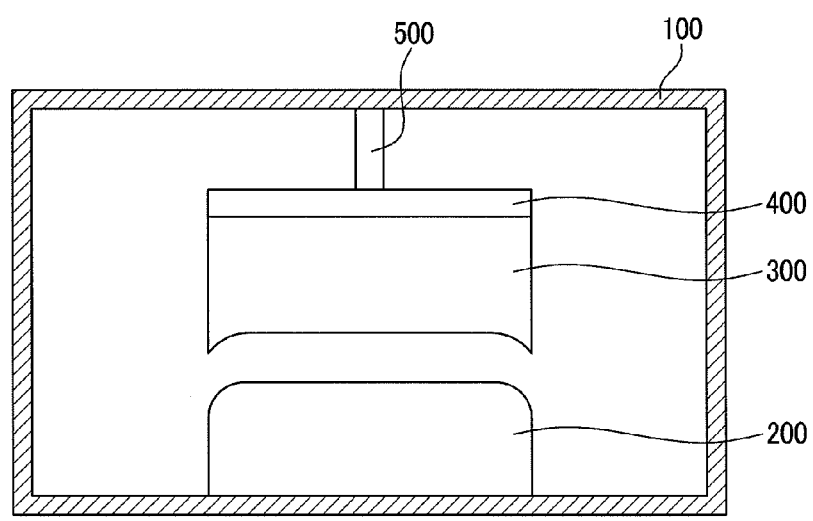
FIG. 1 is a schematic diagram illustrating a device for bonding a window according to a first exemplary embodiment.

Hereinafter, a device for bonding a window and a method for manufacturing a display device will be described in detail with reference to the accompanying drawings. However, the example embodiments are not limited to the described below, but can be implemented in various different forms, and the complete disclosure of the example embodiments is provided in order to inform of the inventive scope to those skilled in the art. Like reference numerals designate like elements throughout.

Further, unless explicitly described to the contrary, the word "comprise" and variations such as "comprises" or "comprising", will be understood to imply the inclusion of stated elements but not the exclusion of any other elements. In addition, throughout the specification, the word "on" will be understood to be positioned above or below a target element and will not be limited to a position at an upper side based on a gravity direction.

Figure 2:
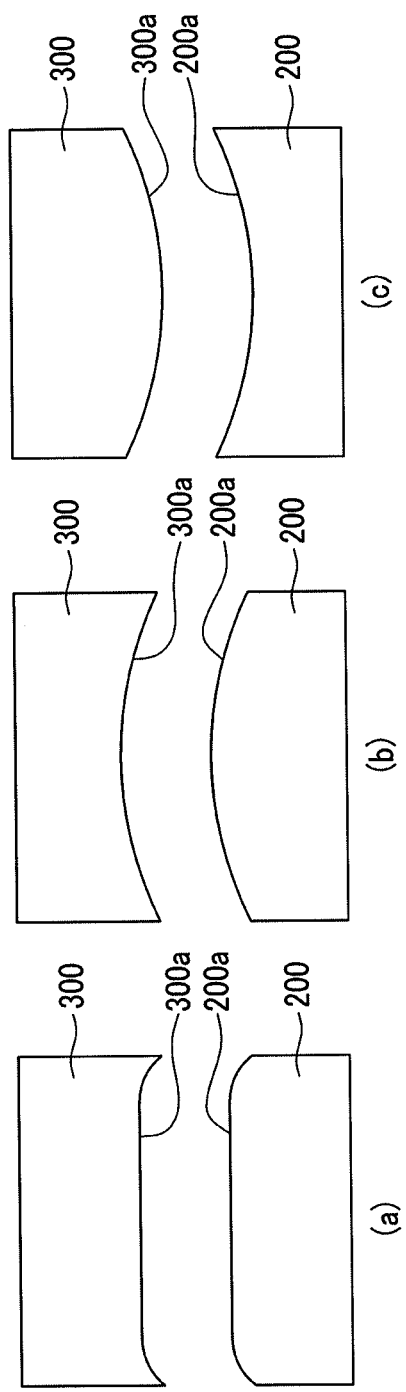
FIG. 2 is a diagram illustrating modified examples of a window fixing unit and a display panel fixing unit in the device for bonding a window according to the first exemplary embodiment.

FIG. 1 is a schematic diagram illustrating a device for bonding a window according to a first exemplary embodiment, and FIG. 2 is a diagram illustrating modified examples of a window fixing unit and a display panel fixing unit in the device for bonding a window according to the first exemplary embodiment.

Referring to FIGS. 1 and 2, a device for bonding a window according to the first exemplary embodiment includes a chamber 100, a display panel fixing unit 200, a window fixing unit 300, and an ultraviolet irradiating unit 400.

The chamber 100, i.e., a means having a processing space therein, may be sealed so as to form vacuum in the processing space therein. A gate (not shown), e.g., through which the window or a flexible display panel moves in and out the processing space, may be further included at a side wall of the chamber 100. Further, a discharging hole (not illustrated) and a discharging pump (not illustrated) connected to the discharging hole are provided at one side wall of the chamber 100. The discharging pump may provide vacuum inside the chamber 100 or discharge the remaining processing gas after a processing is performed in the chamber 100 through the discharging hole.

The display panel fixing unit 200, i.e., a means for fixing the display panel, includes a first curved surface 200*a*, on which a flexible display panel is disposed in order to fix the flexible display panel having a curved surface. The flexible display panel may be, e.g., an organic light emitting display device, a liquid crystal display, or a touch screen panel, but is not limited thereto and may be selected from various display panels having curved surfaces. For example, when the flexible display panel is made of an elastic material, the flexible display panel may be fixed through a fixing unit (not illustrated) such as a clamp. An adhesive layer for attaching the window and the display is coated on the display panel, and the detailed description thereof will be provided below.

The window fixing unit 300, i.e., a means for fixing the window that protects the display panel, includes a second curved surface 300*a*, on which a window is disposed in order to fix the window having a curved surface. The window is disposed in a direction in which an image is output from the display panel 100 and defines an external surface of the display device together with a case (not illustrated) by coupling the case protecting the display panel. The window is attached to the display panel 100 through the adhesive layer.

As illustrated in FIG. 2, the first curved surface 200*a* formed on the display panel fixing unit 200 and the second curved surface 300*a* formed on the window fixing unit 300 have physically complimentary structures, e.g., match or fit within each other. For example, as illustrated in FIG. 2A, when the first curved surface 200*a* includes a flat surface at a center and a curved surface at each edge, the second curved surface 300*a* includes a flat surface at the center and a curved surface coinciding, e.g., aligned, with each curved edge of the first curved surface 200*a*, such that the first curved surface 200*a* matches exactly the second curved surface 300*a*. As illustrated in FIG. 2B, when the first curved surface 200*a* includes a convex-shaped curved surface, the second curved surface 300*a* includes a concave-shaped curved surface coinciding with the first curved surface 200*a*. Similarly, as illustrated in FIG. 2C, when the first curved surface 200*a* includes a concave-shaped curved surface, the second curved surface 300*a* includes a convex-shaped curved surface coinciding with the first curved surface 200*a*. The first curved surface 200*a* and the second curved surface 300*a* are not limited thereto and may be variously changed and implemented so long as the two curved surfaces match with each other. The window may be fixed through a fixing unit (not illustrated), e.g., a clamp, and may be absorbed and fixed by vacuum.

Referring back to FIG. 1, the window fixing unit 300 may further include a moving unit 500 so as to move backward and forward in a direction facing the display panel fixing unit 200. The moving unit 500 allows the second curved surface 300*a* of the window fixing unit 300 to contact the first curved surface 200*a* of the display panel fixing unit 200. By moving the second curved surface 300*a* to contact the first curved surface 200*a*, the window disposed on the second curved surface 300*a* contacts the flexible display panel disposed on the first curved surface 200*a*, thereby enabling bonding between the window and the flexible display panel.

A pressure sensor (not illustrated) for measuring contact strength between the second curved surface 300*a* and the first curved surface 200*a* may be further included in the window fixing unit 300. The pressure sensor contacts the second curved surface 300*a* and the first curved surface 200*a* at optimal pressure to prevent the window and the flexible display panel from being damaged due to strong pressure or to prevent the window and the flexible display panel from being weakly bonded to each other due to weak pressure.

At least a part of the window fixing unit 300 is made of an ultraviolet transmitting material. The window fixing unit 300 transmits ultraviolet light generated by the ultraviolet irradiating unit 400 to be described below, so the ultraviolet light reaches the first curved surface 200*a* through the second curved surface 300*a*. For example, in the first exemplary embodiment, the entire window fixing unit 300 may be formed of an ultraviolet transmitting material. The ultraviolet transmitting material used in the window fixing unit 300 may be, e.g., an acryl plastic material, but is not limited thereto, e.g., may be any suitable material capable of transmitting ultraviolet light.

Any one of the display panel fixing unit 200 or the window fixing unit 300 includes a sensor for arranging the display panel fixing unit 200 or the window fixing unit 300. As a result, the display panel and the window may be accurately arranged.

The ultraviolet irradiating unit 400 is disposed at one side of the window fixing unit 300, e.g., the ultraviolet irradiating unit 400 may be on a surface of the window fixing unit 300 opposite the second curved surface 300a. For example, the ultraviolet irradiating unit 400 may continuously overlap the entire second curved surface 300a. The ultraviolet irradiating unit 400 provides ultraviolet light for curing the adhesive layer between the display panel and the window, thereby attaching the display panel and the window to each other. The ultraviolet light generated from the ultraviolet irradiating unit 400 passes through the window fixing unit 300 made of the ultraviolet transmitting material to be emitted from the second curved surface 300a toward the first curved surface 200a, thereby curing the adhesive layer coated on the display panel.

Figure 3:
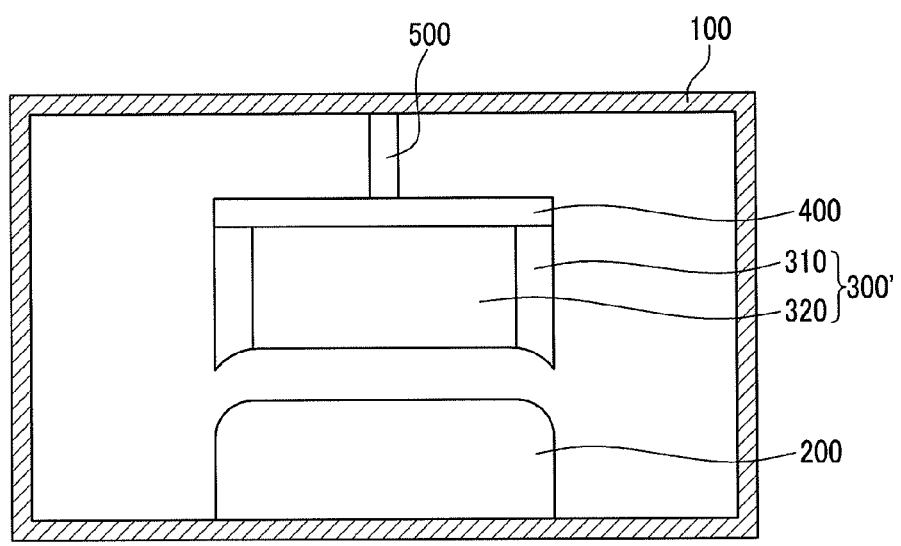
FIG. 3 is a schematic diagram illustrating a device for bonding a window according to a second exemplary embodiment.
Figure 4:
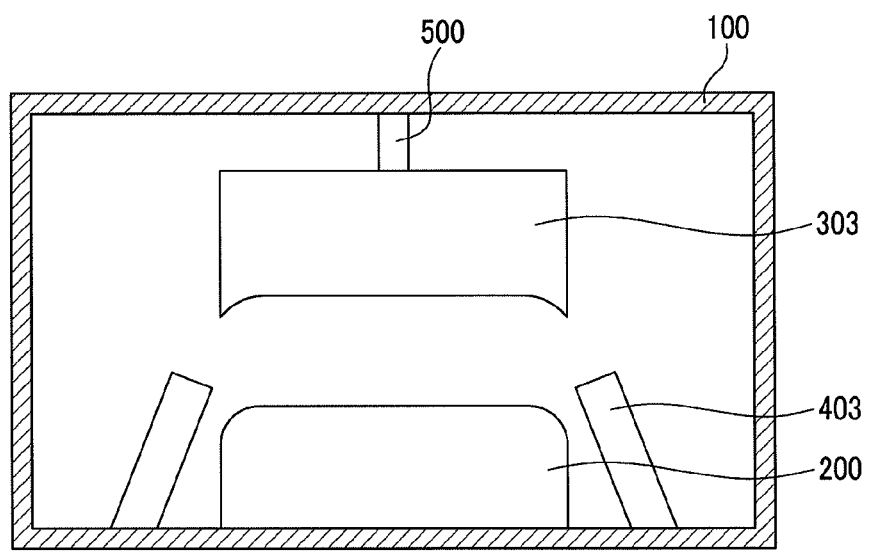
FIG. 4 is a schematic diagram illustrating a device for bonding a window according to a third exemplary embodiment.

FIG. 3 is a schematic diagram illustrating a device for bonding a window according to a second exemplary embodiment, and FIG. 4 is a schematic diagram illustrating a device for bonding a window according to a third exemplary embodiment. Detailed description of elements of the devices for bonding a window according to the second exemplary embodiment and the third exemplary embodiment that are the same as those described previously with reference to the first exemplary embodiment will be omitted.

Referring to FIG. 3, the first curved surface 200a formed on the display panel fixing unit 200 and the second curved surface 300a formed on a window fixing unit 300' may be configured in a form in which the edges are curved surfaces and the centers are flat surfaces, respectively. In this case, the window fixing unit 300' may include an ultraviolet transmitting unit 310, i.e., corresponding to edges of the second curved surface 300a, made of an ultraviolet transmitting material and an ultraviolet non-transmitting unit 320, i.e., corresponding to the center of the second curved surface 300a, made of an ultraviolet non-transmitting material. The ultraviolet light generated from the ultraviolet irradiating unit 400 passes, e.g., only, through the ultraviolet transmitting unit 310 to reach the curved edges of the second curved surface 300a. The window or the display panel is used to firstly attach the curved surface portion because internal stress is generated at the curved surface portion.

Referring to FIG. 4, a window fixing unit 303 may be entirely made of an ultraviolet non-transmitting material. In this case, an ultraviolet irradiating unit 403 is not attached to one side of the window fixing unit 303, but disposed at one side of the inside of the chamber 100, e.g., at a bottom of the chamber 100, to irradiate ultraviolet light to the first curved surface 200a and the second curved surface 300a.

Hereinafter, an operation of the device for bonding a window and a method for manufacturing a display device according to exemplary embodiments will be described with reference to the accompanying drawings.

Figure 5:
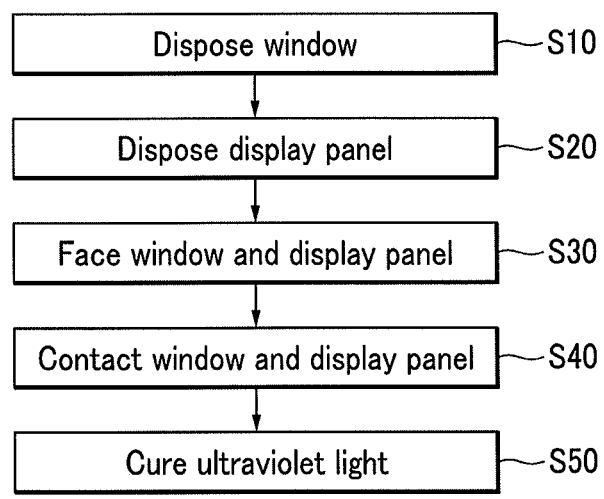
FIG. 5 is a flowchart illustrating a method for manufacturing a display device according to an exemplary embodiment.
Figure 6A:
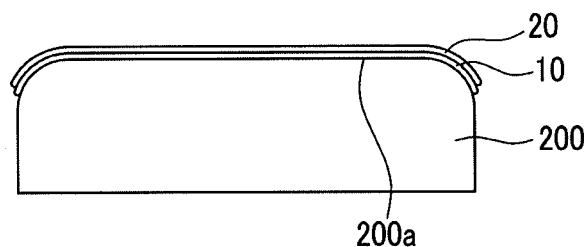
FIGS. 6A to 6C are diagrams illustrating a method for manufacturing a display device according to an exemplary embodiment.
Figure 6B:
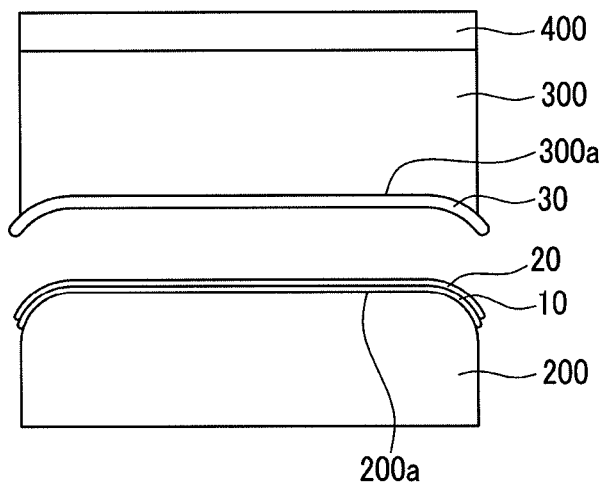
Figure 6C:
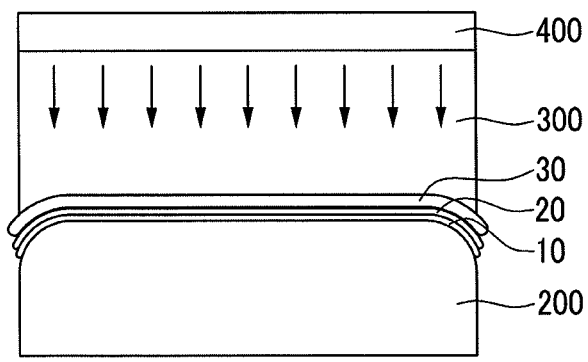

FIG. 5 is a flowchart illustrating a method for manufacturing a display device according to an exemplary embodiment, and FIGS. 6A to 6C are diagrams of a method for manufacturing a display device according to an exemplary embodiment.

As illustrated in FIG. 5, the method for manufacturing a display device according to an exemplary embodiment includes disposing a display panel with an adhesive layer coated thereon (S10), disposing a window (S20), arranging the window and the display panel to face each other (S30), contacting the window with the display panel (S40), and curing the adhesive layer (S50).

In detail, as illustrated in FIG. 6A, a flexible display panel 10 is disposed on the first curved surface 200a included in the display panel fixing unit 200, and an adhesive layer 20 is coated on the flexible display panel 10 (S10). Further, as illustrated in FIG. 6B, a window 30 is disposed on the second curved surface 300a included in the window fixing unit 300 (S20). The adhesive layer 20 may be made of a transparent adhesive material having high transmittance in order to prevent luminance of an image output from the display panel 10 from being reduced. The adhesive layer 20 may be prepared in a liquid state, but may be made in a semi-liquid state having a predetermined viscosity in order to prevent the adhesive layer from flowing down toward the flexible display panel 10.

The disposing of the display panel 10 and the adhesive layer 20, and the disposing of the window 30 may be performed in a vacuum state or may be performed in a non-vacuum state. For example, the flexible display panel 10 is carried into the chamber 100 to be directly disposed on the display panel fixing unit 200, and the adhesive layer 20 may be coated thereon inside the chamber 100. In another example, the display panel fixing unit 200 may be carried outside the chamber 100 for disposing the flexible display panel 10 and coating the adhesive layer 20 thereon, followed by disposing the display panel fixing unit 200 with the flexible display panel 10 and the adhesive layer 20 inside the chamber 100. Similarly, the window 30 is carried into the chamber 100 to be directly disposed on the window fixing unit 300, or alternatively, the window fixing unit 300 may be carried into the chamber 100, after disposing the window 30 on the window fixing unit 300 outside the chamber 100. The disposing of the display panel 10 and the adhesive layer 20 and the disposing of the window 30 may be reversed in a different order.

When the flexible display panel 10 and the window 30 are disposed in the chamber 100, the inside of the chamber 100 may be processed to provide vacuum conditions, e.g., by using a discharging pump. The reason is to prevent bubbles from being generated in the adhesive layer 20 or to prevent a foreign substance from being included. The degree of the vacuum conditions in the chamber 100 may be properly controlled by considering the material of the adhesive layer 20 or the ultraviolet irradiation strength.

Thereafter, the first curved surface 200a with the display panel 10 and the adhesive layer 20 thereon is arranged to face the second curved surface 300a with the window 30 thereon (S30). As illustrated in FIG. 6B, the first and second curved surfaces 200a and 300a are arranged to have the adhesive layer 20 on the first curved surface 200a face directly the window 30 on the second curved surface 300a.

Next, as illustrated in FIG. 6C, the window fixing unit 300 is moved toward the display panel fixing unit 200, e.g., by using a moving means (S40), to contact the display panel fixing unit 200. In this case, the second curved surface 300a and the first curved surface 200a may contact each other at optimal pressure, i.e., via the window 30, adhesive layer 20, and display panel 10, by using a pressure sensor.

Next, the adhesive layer 20 is cured by irradiating ultraviolet light to the adhesive layer 20 disposed between the flexible display panel 10 and the window 30, thereby bonding the window 30 and the flexible display panel 10 to each other (S50). In this case, the window fixing unit 300 is made of an ultraviolet transmitting material, and the ultraviolet light generated from the ultraviolet irradiating unit 400 passes through the window fixing unit 300 to reach the adhesive layer 20. The strength of the ultraviolet light may be properly controlled according to a material, a thickness, and the like. The curing is performed under vacuum conditions.

In the case where the first curved surface 200a formed on the display panel unit 200 and the second curved surface 300a formed on the window fixing unit 300 have curved edges and flat centers, as described previously with reference to FIG. 2, the window fixing unit 300 may be configured to transmit ultraviolet light only to the curved edges, as described previously with reference to FIG. 3. After a predetermined time elapses, when the adhesive layer 20 is cured by the ultraviolet light, the flexible display panel 10 and the window 20 are bonded to each other.

According to the exemplary embodiments, it is possible to reduce defects during bonding of the display panel and the window by uniformly curing the adhesive layer between the display panel and the window, thereby preventing generation of bubbles in the adhesive layer. As a result, it is possible to prevent deterioration in the display quality, e.g., a screen spot, by preventing a minute curve which may be generated between the window and the display panel. Further, it is possible to increase adhesion between the window and the display panel.

In contrast, when a conventional method is used to attach the window to the display panel, after an adhesive layer is coated on the display panel in a liquid state, the display panel and the window may be bonded to each other at atmospheric pressure, rather than under vacuum conditions, during curing of the adhesive layer. However, use of the adhesive layer at atmospheric pressure may generate bubbles in the adhesive layer or cause non-uniform adhesion of the adhesive layer. Further, in the case of a curved flexible display device, there may also be problems of alignment between the display panel and the window, in addition to bubbles and non-uniformity problems.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 10: Display panel | 20: Adhesive layer |
| 30: Window | |
| 100: Chamber | 200: Display panel fixing unit |
| 300: Window fixing unit | 400: Ultraviolet irradiating unit |
| 500: Moving means | |

What is claimed is:

1. A device for bonding a window, the device comprising:
   a chamber having an internal space;
   a display panel fixing unit in the chamber, the display panel fixing unit including a first curved surface to attach to a flexible display panel;
   a window fixing unit in the chamber and including a second curved surface, at least part of the window fixing unit including an ultraviolet transmitting material, and the second curved surface facing the first curved surface and being complementary with the first curved surface to attach to a window; and
   an ultraviolet irradiating unit on the window fixing unit, the ultraviolet irradiating unit being spaced apart from the second curved surface of the window fixing unit to irradiate ultraviolet light through the window fixing unit toward the first curved surface of the display panel fixing unit,
   wherein the ultraviolet irradiating unit is on an opposite surface of the window fixing unit with respect to the second curved surface, the ultraviolet irradiating unit being continuous along the entire opposite surface.

2. The device for bonding a window of claim 1, wherein the window fixing unit further comprises a moving unit to move the window fixing unit toward the display panel fixing unit.

3. The device for bonding a window of claim 1, wherein each of the first curved surface and the second curved surface includes a flat surface in a center portion and curved edges extending from the flat surface.

4. The device for bonding a window of claim 3, wherein the window fixing unit includes side parts formed of an ultraviolet transmitting material and a center part formed of an ultraviolet non-transmitting material, the center part defining the flat surface of the second curved surface, and the side parts defining the curved edges of the second curved surface.

5. The device for bonding a window of claim 1, wherein the ultraviolet irradiating unit is directly on the opposite surface of the window fixing unit with respect to the second curved surface.

6. The device for bonding a window of claim 1, wherein the ultraviolet irradiating unit is movable together with the window fixing unit.

7. The device for bonding a window of claim 2, wherein the ultraviolet irradiating unit is between the window fixing unit and the moving unit.

8. The device for bonding a window of claim 1, further comprising a discharging pump to provide vacuum conditions in the chamber.

9. The device for bonding a window of claim 1, wherein at least a portion of the window fixing unit between the ultraviolet irradiating unit and the second curved surface includes the ultraviolet transmitting material.

10. The device for bonding a window of claim 9, wherein the entirety of the portion of the window fixing unit is formed of the ultraviolet transmitting material.

* * * * *